United States Patent
Rau et al.

(10) Patent No.: US 12,283,007 B2
(45) Date of Patent: Apr. 22, 2025

(54) METHOD FOR GENERATING AN AUGMENTED IMAGE

(71) Applicant: TeamViewer Germany GmbH, Göppingen (DE)

(72) Inventors: Sascha Rau, Göppingen (DE); Arnab Poddar, Esslingen (DE)

(73) Assignee: TEAMVIEWER GERMANY GMBH, Göppingen (DE)

( * ) Notice: Subject to any disclaimer, the term of this patent is extended or adjusted under 35 U.S.C. 154(b) by 245 days.

(21) Appl. No.: 18/122,517

(22) Filed: Mar. 16, 2023

(65) Prior Publication Data
US 2023/0298284 A1    Sep. 21, 2023

(30) Foreign Application Priority Data
Mar. 21, 2022   (EP) .................................. 22163296

(51) Int. Cl.
G06T 19/00    (2011.01)
G06V 10/74    (2022.01)
H04N 5/265    (2006.01)

(52) U.S. Cl.
CPC .......... G06T 19/006 (2013.01); G06V 10/761 (2022.01); H04N 5/265 (2013.01); *G06V 2201/07* (2022.01)

(58) Field of Classification Search
CPC ............. G06T 19/006; G06T 2219/004; G06T 2219/024; G06V 10/761; G06V 2201/07; H04N 5/265
See application file for complete search history.

(56) References Cited

U.S. PATENT DOCUMENTS

| | | |
|---|---|---|
| 10,713,851 B2 | 7/2020 | Holzer et al. |
| 2015/0123966 A1 | 5/2015 | Newman |
| 2018/0165879 A1 | 6/2018 | Holzer et al. |
| 2021/0350595 A1* | 11/2021 | Zhu ........................... G06T 7/66 |

OTHER PUBLICATIONS

European Search report cited in corresponding European patent application No. 22163296.1; Aug. 16, 2022; 7 pp.

* cited by examiner

*Primary Examiner* — Sing-Wai Wu
(74) *Attorney, Agent, or Firm* — Lempia Summerfield Katz LLC (57) ABSTRACT

A computer implemented method for generating an augmented image includes the steps of detecting a user input representing a shape and a position of a spatially extended 2D object and of calculating 3D coordinates of a point of interest that is associated with the 2D object. This calculation comprises the steps of calculating a 3D centroid of a first 3D object that is derived from the 2D object, and/or of performing a 2D pattern recognition algorithm that analyses the 2D object. Then 3D coordinates of a second 3D object are calculated, thereby assuming that the second 3D object is located at the same distance from the camera as the point of interest.

10 Claims, 7 Drawing Sheets

METHOD FOR GENERATING AN AUGMENTED IMAGE

CROSS-REFERENCE TO RELATED APPLICATION

This application claims priority to European Patent Application No. 22163296.1, filed Mar. 21, 2022. The disclosure of this application is incorporated herein by reference in its entirety.

BACKGROUND OF THE DISCLOSURE

1. Technical Field

The present disclosure relates to a method implemented by a computer for generating an augmented image. Such a method comprises the steps of acquiring images of a real three-dimensional scene from different positions, motion tracking and augmenting the images by overlaying digital information. The disclosure also relates to a mobile terminal configured to perform the method and to a computer program product.

2. Description of the Prior Art

Augmented reality (AR) systems and applications present enhanced information of real environment by providing a visualization of overlaying digital information, particularly computer-generated virtual information, with images of the real environment. The real environment or scene is captured, for example, with a camera held by a user or being part of a mobile terminal such as a smartphone or a tablet computer. An example of such a system is described in U.S. Pat. No. 10,713,851 B2.

In augmented reality systems, the digital information has to be overlaid with the image of the real scene at the right place in order to offer a satisfying visual perception to users. This means that the digital information should be overlaid with the real scene at the desired pixel positions within the image and in the correct perspective way, i.e. adapted to and derived from the real environment being viewed. In order to achieve this, the pose of the camera, i.e. its orientation and position, with respect to the real scene has to be known. Various vision-based online tracking solutions have been developed to compute the pose of the camera for augmented reality applications.

One application for augmented reality is interactive remote field support that enables persons to collaborate with offsite experts. The offsite expert may guide the on-site technician using arrows or freehand circles to mark up the screen, thereby providing guidance and clarifying troubleshooting steps. The offsite expert may, for example, support in identification of the correct spare part, document the part number, and initiate the order process for replacements. This helps to decrease unplanned downtime of expensive machinery and other technical systems. Such remote field support is offered by the applicant under the trademark TeamViewer Assist AR®.

However, it has turned out that even the most sophisticated tracking algorithms occasionally fail to overlay the digital information adequately on the real environment. For example, if an element of the real environment is marked by a user by drawing a circle around the element, it turns out that the circle may be displayed distorted and at the wrong location if the view of the camera is changed significantly. In applications as interactive remote field support, this can lead to confusion and, in the worst case, to wrong instructions being given, or the wrong parts being ordered.

SUMMARY OF THE DISCLOSURE

It is therefore an object of the disclosure to provide a method for generating an augmented image in which circles, arrows or other markings produced or drawn by a user are correctly overlaid with the image of a real scene even if the camera's pose changes significantly.

This object is solved, in accordance with the disclosure, by a method implemented by a computer for generating an augmented image, wherein the method comprises the following steps:
 a) acquiring, from a first position, a first image of a three-dimensional (3D) scene using a camera;
 b) obtaining 3D information of the 3D scene and calculating allocations of 3D coordinates to pixels in the first image;
 c) detecting a user input representing a shape and a position of a spatially extended two-dimensional (2D) object in the first image;
 d) calculating 3D coordinates of a point of interest that is associated with the 2D object, wherein this calculating step comprises at least one of the following two steps:
  calculating a 3D centroid of a first 3D object that is derived from the 2D object, or
  performing a 2D pattern recognition algorithm;
 e) calculating 3D coordinates of a second 3D object, thereby assuming that the second 3D object is located at the same distance from the camera as the point of interest;
 f) calculating a first projection of the second 3D object, thereby using the 3D coordinates calculated in step e);
 g) augmenting the image by overlaying the first projection of the second 3D object calculated in step f);
 h) moving the camera from the first position to a second position and acquiring, from the second position, a second image of the 3D scene;
 i) calculating a second projection of the second 3D object for the second position, thereby using the 3D coordinates calculated in step e); and
 j) augmenting the second image by overlaying the second projection of the second 3D object calculated in step i).

The inventor has discovered that the main cause of user added objects being overlaid in a distorted way and/or at the wrong location is that the user added object is displayed at the wrong distance from the camera. For example, if the added object is a circle that surrounds an element to be marked, the correct distance would be the distance of the element at the center of the circle. In prior art algorithms, however, the circle is displayed at a distance where the area covered by the circle is located.

The disclosure achieves the correct placement of user added objects by calculating in step d) 3D coordinates of a point of interest that is associated with the 2D object that has been input by the user. This user input is typically a pan gesture on a touch-sensitive screen, but the user may also user another interface for inputting the 2D object, for example a mouse or a touchpad. The point of interest represents the "true" location that the user intends to mark. In the case of a circle, a rectangle, a triangle or any other line that is at least substantially closed, this point of interest is usually the 2D centroid of the line. If the 2D object is an arrow, the point of interest may be derived from a tip of the arrow. In cases in which the 2D object comprises two crossing lines, the point of interest may be equated with the point at which the two lines cross.

The second 3D object that is derived from the user added 2D object is then placed, by calculating its 3D coordinates, in step e) at the same distance from the camera as the point of interest, thereby ensuring that the second 3D object will be located at the correct distance from the camera. This will become apparent only after the camera changes from the first position to a second position, because then the second 3D object must be displayed differently due to the different perspective.

In some cases, for example for circles or other closed lines, the point of interest is, in a projection on the first image, outside the 2D object drawn by the user. In other cases, for example if the 2D object is an arrow, the point of interest may be located on a borderline of the 2D object. In still other cases, for example if the object is a cross, the point of interest is located inside the object.

For computing the point of interest, there are two different approaches. For circles and other at least substantially closed lines, the point of interest may be calculated in step d) by deriving the first 3D object from the 2D object by using the allocations of 3D coordinates to pixels in the image computed in step b);
calculating the 3D centroid for the first 3D object; and
deriving the point of interest from the 3D centroid.

Calculating the 3D centroid reflects the fact that for a 2D object formed by a closed line the point of interest is usually somewhere at its center. The 3D centroid can often be easily calculated because the available AR programming platforms provide commands that output the 3D coordinate associated with pixels in the image, thereby using the allocations of 3D coordinates to pixels computed in step b).

The term 3D centroid is to be construed broadly and encompasses not only the exact arithmetic mean position of all the 3D points, but also approximations. For example, the 3D object may be approximated by a polygon mesh having N vertices. Then only the coordinates of the N vertices may be used for calculating the 3D centroid.

The simplest approach would be to calculate 2D coordinates of the 3D centroid in the first image and to derive the point of interest with this pixel. However, with this approach misplacements or distortions of the user added object may still occur too frequently. For example, if an element surrounded by a user added circle is very small, the pixel determined in this way may be located just outside the element.

In an embodiment, the step of deriving the point of interest from the 3D centroid therefore comprises the further steps of projecting the 3D centroid on the first image;
calculating 2D coordinates of the 3D centroid in the first image;
considering pixels in a defined neighborhood of the 2D coordinates of the 3D centroid;
calculating distance values for the considered pixels; and
deriving the point of interest from the pixel for which the shortest distance to the camera is calculated.

Considering a number of pixels in a defined neighborhood of the 2D coordinates of the 3D centroid ensures that the user added object is not accidentally placed at a location outside the element that shall be marked.

The second approach for computing the point of interest involves using a 2D pattern recognition algorithm. In that case the point of interest is not calculated on the basis of the first 3D object, but only on the basis of the 2D object input by the user.

For example, if the pattern recognition algorithm recognizes a circle or an at least substantially closed line, the 2D centroid of this line would be calculated. However, the benefit of this approach becomes particularly apparent in cases in which the 2D object is an arrow or a cross. In such cases computations of centroids usually result in wrong placements of the object, because the center of interest of an arrow—namely, its tip—does not coincide with its centroid.

In some embodiments, step b) comprises the steps of acquiring several images from different positions and comparing the several images in order to obtain 3D information of the scene. For example, Simultaneous Localization and Mapping (SLAM), i.e. algorithms that are based on concepts in computational geometry and computer vision, may be used to construct a 3D map of the scene.

Such tracking algorithms may also be used to keep track of the cameras position within the scene so that a change of the second position relative to the first position can be computed.

The various steps described above involve calculations that may be performed in a processor of any of the devices involved, and/or in a processor of a server that connects the devices. In interactive remote field support applications, the computations may be performed by the processor of the device that acquires the images.

A subject of the disclosure is also a mobile terminal such as a smartphone, a smartwatch or a tablet computer, wherein the mobile terminal is configured to perform the method outline above. The mobile terminal comprises a camera configured to acquire the first and the second image, a display configured to display the first and the second image, and data processing means configured to perform the computations recited in any of the preceding steps, calculations, or processes.

A subject of the disclosure is also a computer program product adapted to be loaded into an internal memory of a digital computer system and comprising code instructions for executing the method outlined above when the computer program product is running on the computer system.

BRIEF DESCRIPTION OF THE DRAWINGS

Various features and advantages of the present disclosure may be more readily understood with reference to the following detailed description taken in conjunction with the accompanying drawings in which.

DETAILED DESCRIPTION OF EMBODIMENTS

1. Interactive Remote Field Support

Figure 1:
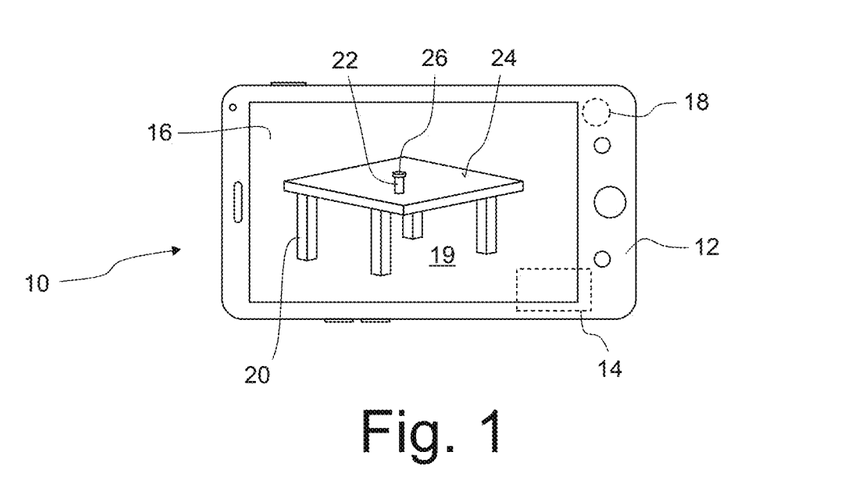
FIG. 1 is a schematic top view on a smartphone of an on-site technician displaying a scene while performing interactive remote field support.
Figure 2:
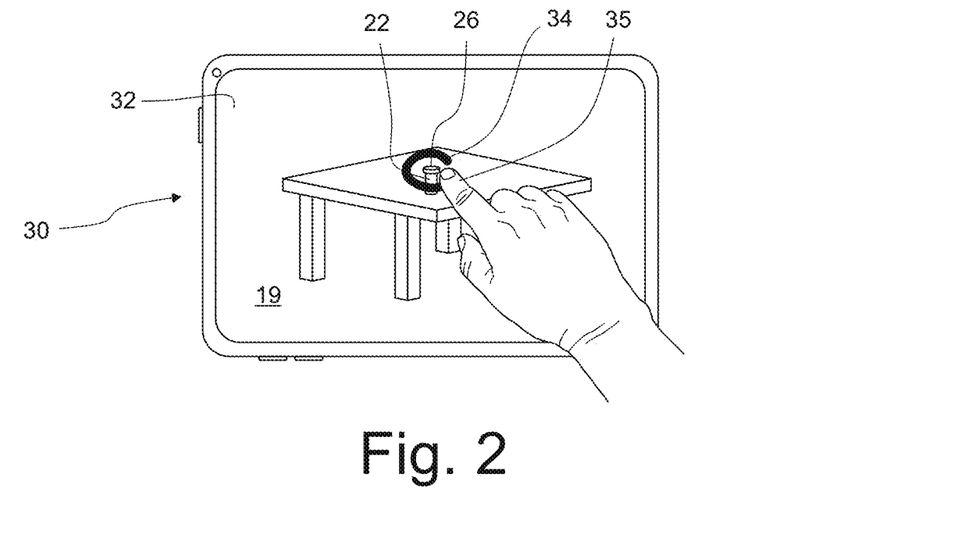
FIG. 2 is a schematic top view on a tablet computer of an off-site expert displaying the same scene, wherein the expert draws a circle to mark an element of the scene.

FIGS. 1 and 2 illustrate an example of how augmented reality in interactive remote field support typically works. It is assumed that an on-site technician has a mobile terminal such as a conventional smartphone 10. The latter comprises a housing 12, a processor indicated at 14, a touch sensitive display 16 and a camera indicated at 18 and arranged on the rear side of the smartphone 10.

The on-site technician uses the camera 18 of the smartphone 10 to capture moving images of a scene 19, which, for simplicity, consists only of a table 20 and a container 22 placed on the tabletop 24 and closed with a lid 26.

The moving images of the scene are transmitted from the on-site technician's smartphone to a stationary computer or a mobile terminal such as a tablet computer 30 that is operated by an off-site expert. The off-site expert thus sees on a touch-sensitive display 32 of his tablet computer 30 images of the same scene 19 as the on-site technician.

It is now assumed that the off-site expert wants to mark an element, e.g. the lid 26 of the container 22, for the on-site technician. This can be useful, for example, if there is not only one container 22 on the tabletop 24 but a plurality of similar containers, and only the expert knows which of the containers is the right one for a particular purpose. For marking the lid 26, the off-site expert draws a circle 34 around the lid 26. He may do this by performing a pan gesture with one of his fingers 35 on the touch sensitive display 34, or he may use another user interface such as a mouse or a touchpad to draw the circle 34.

The circle 34 in the image will be processed in a manner that will be explained in more detail below. The processed circle is then automatically transmitted to the smartphone 10 of the on-site technician so that the technician also sees a circle 34' at the same position, see FIG. 3*a*. But in an augmented reality environment, the processed circle 34' shown on both displays 18, 30 will not be a simple 2D object at a fixed position in the plane of the display 16, but a virtual 3D object overlaid to the real scene 19.

This will become apparent once the on-site technician changes his/her position within the scene 19. For example, if the on-site technician moves, together with his smartphone 10 including the camera 18, slightly to the left, which corresponds to a small rotation by a few degrees of the scene 19 in the opposite direction (see arrow 36), the augmented 3D circle 34' will be displayed differently, because the camera 18 has now a different pose, see FIG. 3*b*.

However, the prior art algorithms place the augmented 3D object (i.e. the circle 34') on the tabletop 24, because this is the element of the scene 19 that is covered by the circle 34 that has been drawn by the off-site expert on his display 32. Consequently, the augmented 3D circle 34' will be displayed as if it adhered to the tabletop 24.

Figure 3A:
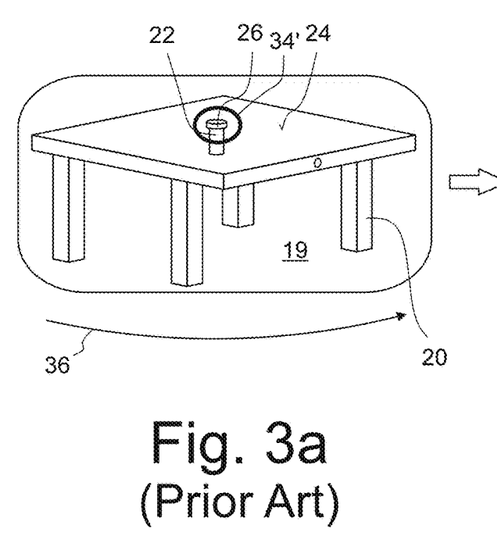
FIGS. 3a and 3b are images of the same scene from two different camera positions, but augmented with a 3D circle defined by the off-site expert, with the augmentation calculated using a prior art AR algorithm.
Figure 3B:
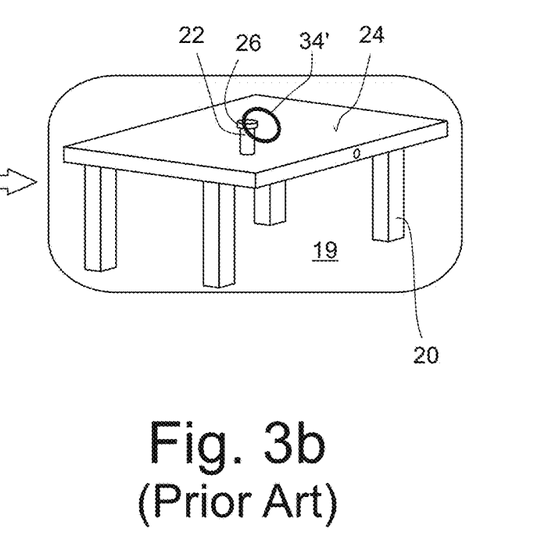

As can be seen in FIG. 3*b*, this may lead to situations in which the augmented 3D circle 34' does not surround the lid 26 of the container 22 after relative movements between the camera 18 and the real scene 19. In other words, since the augmented 3D circle 34' is computationally placed at the wrong distance from the camera 18, it will be displayed distorted and/or at the wrong location.

Figure 4A:
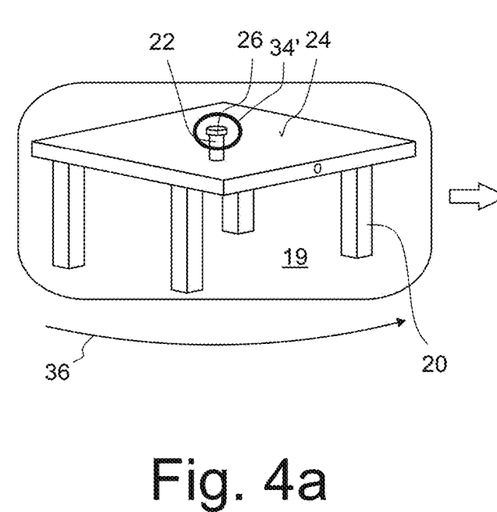
FIGS. 4a and 4b are images similar to FIGS. 3a and 3b, but with the augmentation calculated using an improved algorithm in accordance with the present disclosure.
Figure 4B:
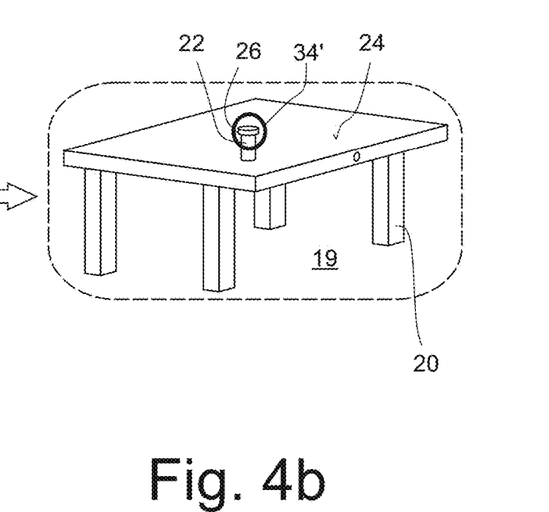

FIGS. 4*a* and 4*b* illustrate the same arrangement as shown in FIGS. 3*a* and 3*b*, but assuming that an improved algorithm in accordance with the present disclosure has been used to place the augmented 3D circle 34'. The improved algorithm ensures that the augmented 3D circle 34' will be computationally placed at the same distance from the camera 18 as the lid 26. Then the circle 34' will correctly surround the lid 26 even if the pose of the camera 18 within the scene 19 changes, as this can be seen by comparing FIGS. 3*b* and 4*b*.

Two approaches how this can be accomplished in accordance with the present disclosure will be explained in the following section.

2. 3D Centroid Determination

A first approach to achieve a correct placement of the augmented 3D circle 34'- or more generally of an augmented virtual object defined by a user input—in the scene 19 involves the computation of a 3D centroid.

Figure 14:
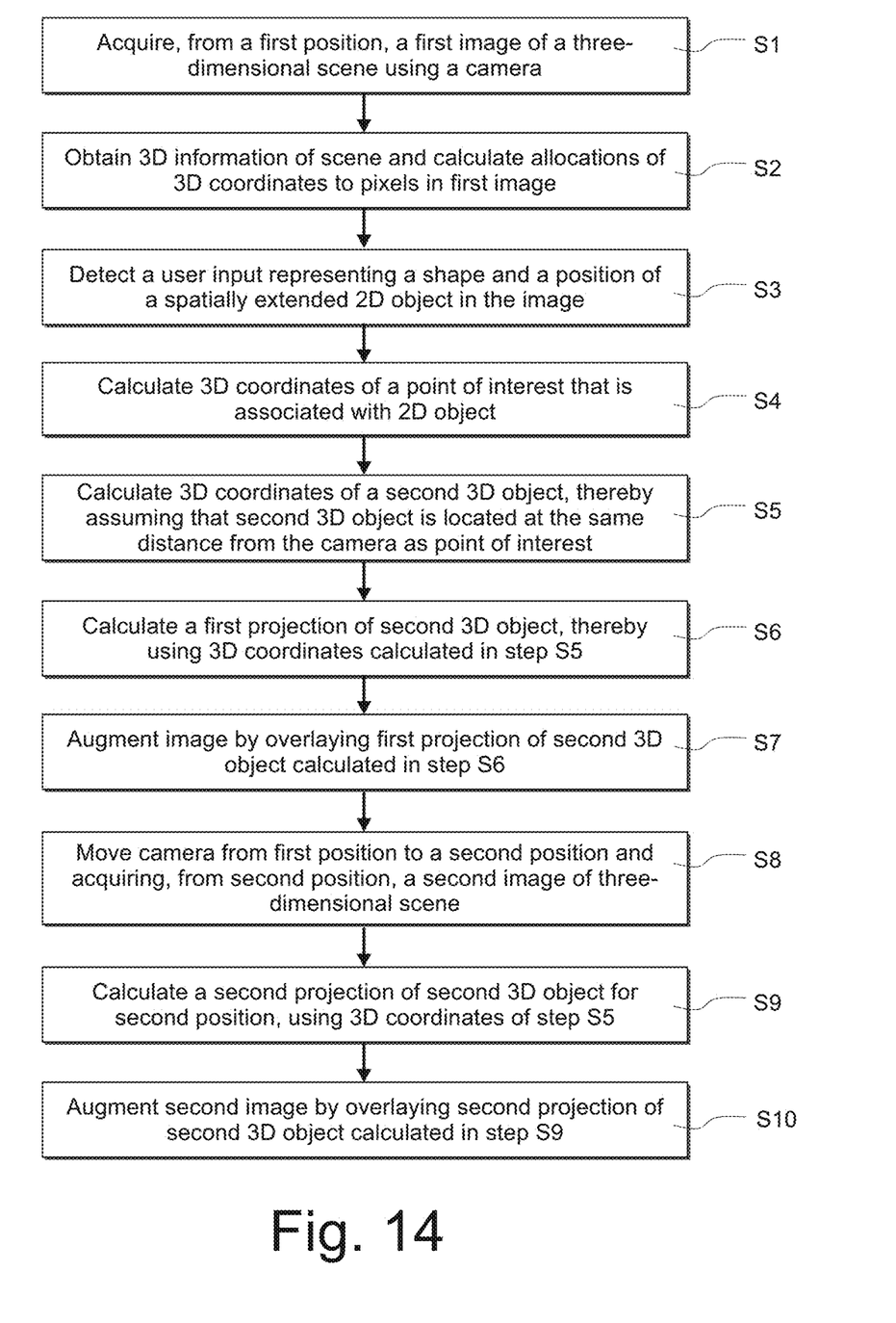
FIG. 14 is a flow diagram for illustrating important method steps in accordance with the disclosure.
Figure 15:
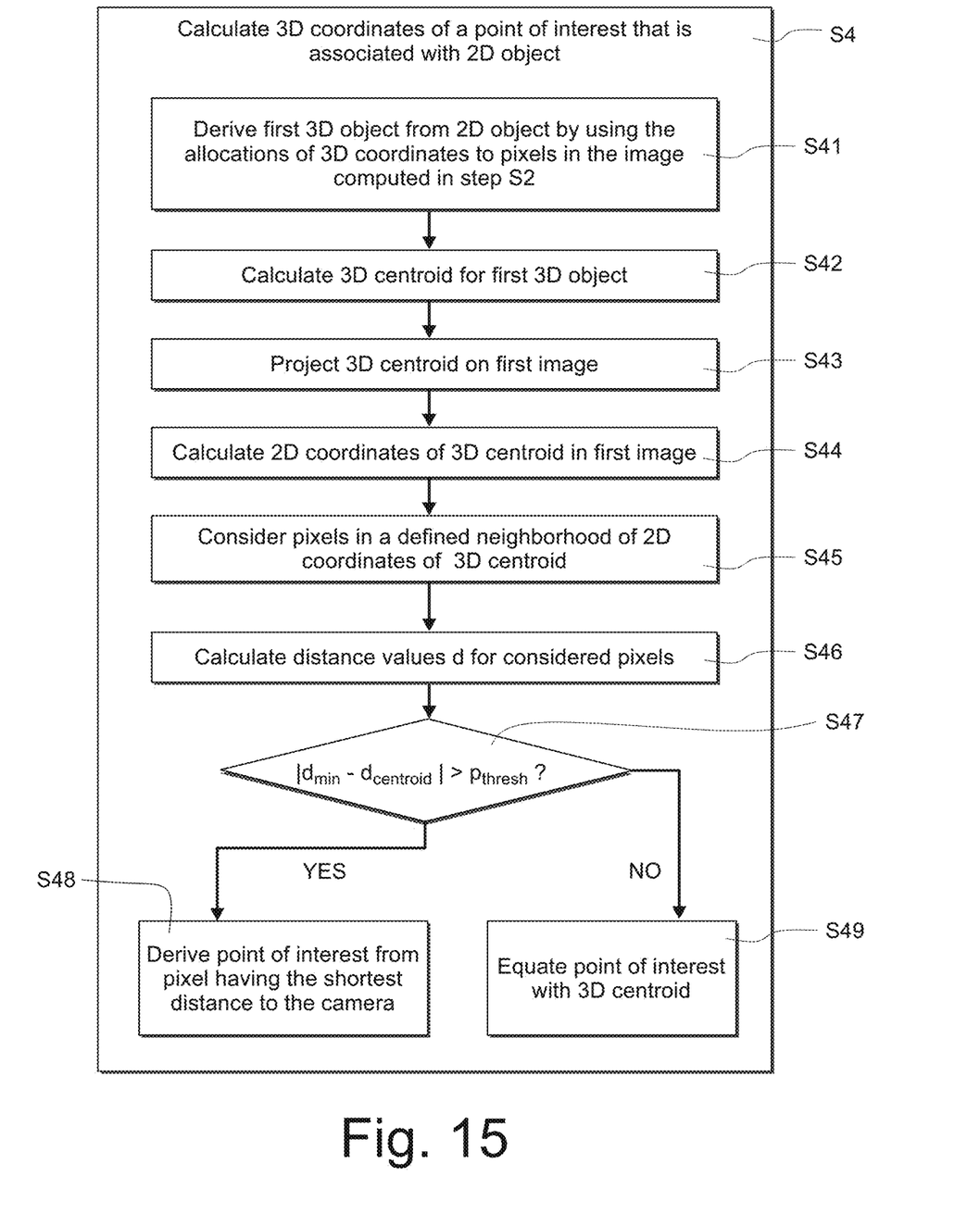
FIG. 15 is a flow diagram for illustrating additional method steps that are required for a first approach in which a 3D centroid is calculated.

The flow diagram shown in FIG. 14 illustrates important method steps S1 to S10 that are performed in accordance with the present disclosure, and the flow diagram shown in FIG. 15 illustrates optional sub-steps S41 to S49 that are performed only if a 3D centroid is determined in step S4 according to the first approach. The method steps represented in both flow diagrams will be explained with reference to the example constellation shown in FIGS. 1, 2, 4*a* and 4*b*.

FIG. 14 illustrates that in a first step S1, a first image— here the image shown in FIG. 1—is acquired from a first position using the camera 18 of the smartphone 10.

In a second step S2, 3D information of the scene 19 is obtained. Most available algorithms, for example Simultaneous Localization and Mapping (SLAM) algorithms, produce the 3D information by acquiring several images of the scene 19 from different camera positions and comparing these images. However, range imaging camera systems such as ToF (Time of Flight) cameras may alternatively or additionally be used for this purpose. After obtaining 3D information of the scene 19, a virtual 3D model of the scene 19 is available. The 3D coordinates obtained in this manner are then allocated to each pixel in the first image.

Figure 5:
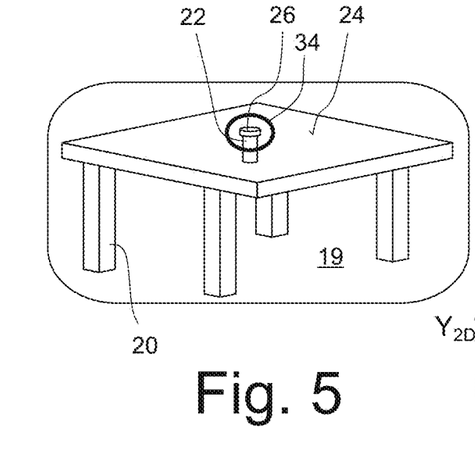
FIG. 5 shows the contents of the display of the smartphone after the off-site expert has drawn a circle to mark an element of the scene.

In a third step S3, a user input representing a shape and a position of a spatially extended 2D object in the image is detected. This step has already been explained above with reference to FIG. 2. There the 2D object is the circle 34 that is input by the off-site expert and is transmitted, after being transformed into a virtual 3D object, to the smartphone 10 of the on-site technician. The contents of the display 18 of the smartphone 10 is shown in FIG. 5.

Figure 6:
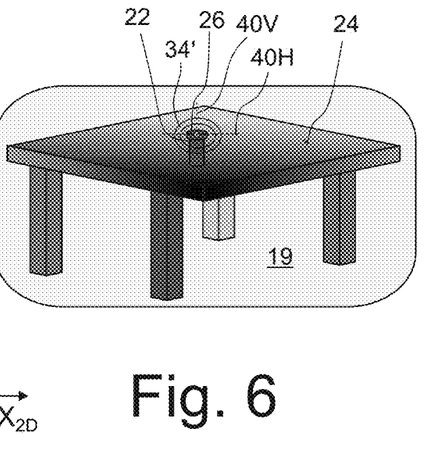
FIG. 6 is an illustration similar to FIG. 5, wherein distance information associated with the pixels is encoded in the greyscale.

FIG. 6 illustrates the allocation of pixels of the display 18 with 3D coordinates. Additional distance or depth information is coded in the greyscale. The brighter the shade of grey, the further away a point in the scene associated with a pixel is from the camera 18.

In a fourth step S4, 3D coordinates of a point of interest that is associated with the 2D object (circle 34) are calculated. According to the first approach, this step includes the determination of a 3D centroid, as this will become apparent from the following explanation of sub-steps S41 to S49 with reference to the flow diagram of FIG. 15.

In a sub-step S41, a first virtual 3D object is derived from the 2D object (circle 34) by using the allocations of 3D coordinates to pixels in the image computed in step S2. Referring again to FIG. 6, it can be seen that most of the pixels representing the circle 34 have the same distance from the camera 18 as the tabletop 24. Therefore, the first virtual 3D object derived in sub-step S41 is basically a "circular" cutout from the tabletop 24, i.e. an object that is arranged in the 3D space in the same manner as the tabletop 24.

Figure 7A:
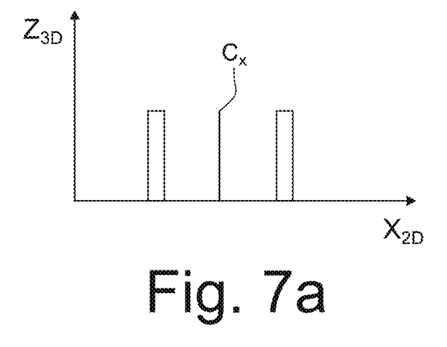
FIGS. 7*a* and 7*b* are histograms illustrating depth distributions along two orthogonal directions.
Figure 7B:
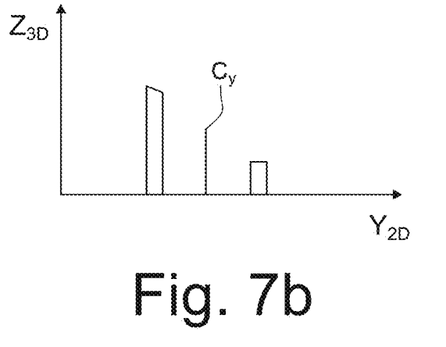

In a sub-step S42, a 3D centroid for the first virtual 3D object is calculated. FIGS. 7*a* and 7*b* illustrate how this may be accomplished. FIG. 7*a* is a histogram illustrating the depth distribution along a horizontal line 40H (see FIG. 6) that crosses the virtual 3D circle 34'. Along this horizontal direction all 3D points associated to pixels in the image have the same distance from the camera 18. Consequently, the centroid Cx along this direction is located between the two columns and also has the same distance from the camera 18. This distance is equal to the distance to the tabletop 24 at the position of the horizontal line 40H.

FIG. 7*b* is a histogram illustrating the depth distribution along a vertical line 40V (see FIG. 6) that also crosses the virtual 3D circle 34. Along this vertical direction, the 3D points associated to pixels in the image have different distances from the camera 18. More specifically, the upper portion of the vertical line 40V passes again areas on the tabletop 24 that are slightly further away from the camera 18 as compared to the horizontal line 40H. However, the lower portion of the vertical line 40V passes areas on the container 22 that is significantly closer to the camera 18 (i.e. darker in FIG. 6) than the tabletop 24. Consequently, the centroid Cy along the vertical line 40V is located between the two columns but has a distance that is closer to the camera 18, i.e. has smaller $Z_{3D}$ values.

Illustratively speaking, the 3D centroid is obtained by averaging over all directions. Since the 3D circle 34 # covers mainly areas on the tabletop 24, the 3D centroid will be placed at the center of the 3D circle 34', but at a distance that is further away from the camera 18 than the container 22 or the lid 26.

Figure 8:
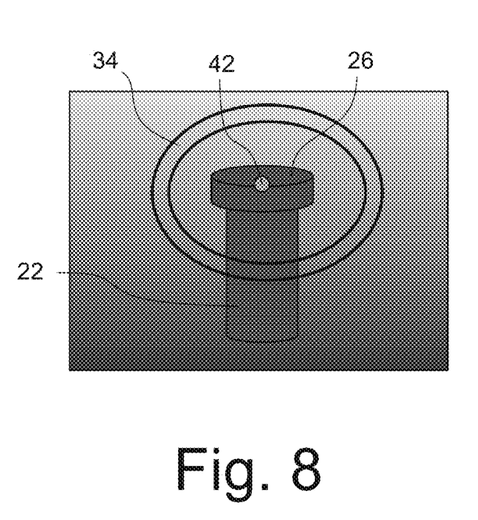
FIG. 8 illustrates the position of a 3D centroid derived from the marked element in an enlarged cutout from FIG. 6.

FIG. 8 illustrates the position of the 3D centroid denoted by 42 in an enlarged cutout from FIG. 6. The brighter shade of grey gray of the 3D centroid 42 indicates that it has a distance from the camera 18 that is larger than the distance of the container 22 and the lid 26.

Figure 9:
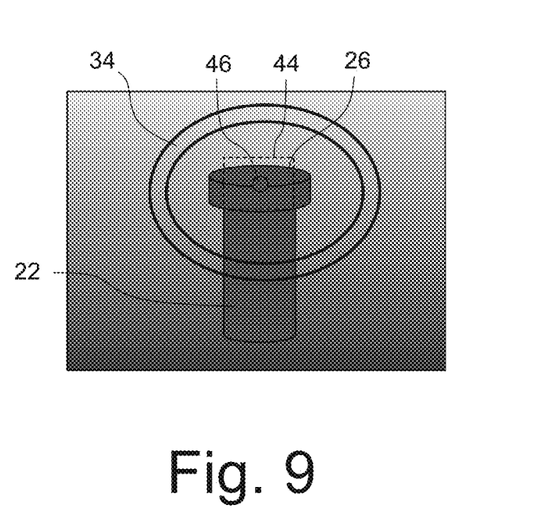
FIG. 9 corresponds to FIG. 8, but additionally illustrates how pixels in a defined rectangular neighborhood are considered for determining a point of interest.

In a sub-step S43, the 3D centroid 42 is projected on the first image, and in a sub-step S44 the 2D coordinates of the 3D centroid 42 in the first image are calculated. This is because the next sub-step S45 is performed not in 3D space, but in the first 2D image in which the off-site expert has drawn the circle 34. In this sub-step S45, pixels in a defined neighborhood of the 2D coordinates of the centroid 42 are considered, as this is illustrated in FIG. 9, which indicates the distance values again in different shades of gray although the image is only 2D. The neighborhood in this embodiment is defined by a rectangle 44 indicated with a broken line and drawn symmetrically around the 2D coordinate of the 3D centroid 42 in its projection in the first image.

In a sub-step S46, distance values for the considered pixels, i.e. for all or a subset of the pixels within the rectangle 44, are calculated, thereby using again the allocations calculated in step S2. As can be seen in FIG. 9, those pixels that are outside the container 22 and the lid 26 have associated distance values that are significantly larger than the distance values that are associated with the remaining pixels.

The algorithms now compare, in a sub-step S47, the smallest distance value $d_{min}$, which corresponds to the "darkest" pixel in the rectangle 44, with the distance value $d_{centroid}$ of the 3D centroid 42. If the absolute value of the difference between these two distance values is larger than a predefined threshold value $p_{thres}$, the point of interest is derived from the pixel 46, which is associated with the shortest distance to the camera (sub-step S48). Otherwise, the point of interest is equated with the 3D centroid 42 (sub-step S49).

In a situation as illustrated in FIGS. 8 and 9, said absolute value of the difference is large, and therefore the point of interest will be derived from the pixel 46, which is associated with the shortest distance to the camera (sub-step S48). This will be a pixel 46 on the lid 26. If the 3D resolution is small, this point may be on the container 22—but usually it will not be on the tabletop 24, i.e. the bright region in the rectangle 44. The 3D coordinates of the point of interest are derived from the 2D coordinates of the pixel 46 in the first image and the associated distance value.

Referring again to FIG. 14, 3D coordinates of a second 3D object are now calculated in a step S5, thereby assuming that the second 3D object is located at the same distance from the camera 18 as the point of interest 46. In the scenario shown in FIG. 9, this implies that the second 3D object, which is again a 3D circle, will be placed at the distance of the lid 26 and not at the distance of the tabletop 24, as this has been explained further above with reference to FIGS. 4*a* and 4*b*. In situations in which the 3D centroid is at least approximately located on the element of the scene 19 that shall be marked with the circle 34 (sub-step S49), the second object will be—at least basically—equal to the first object, which is in this embodiment a 3D circle. Otherwise, the second 3D object will have the same shape as the first 3D object but will be placed at a significantly different distance to the camera 18. The difference between the first and the second 3D object will become apparent only after relative movements between the scene 19 and the camera 18.

The comparison sub-step S47 may be dispensed with. Then sub-step S48 always follows sub-step S46. Adding the decision step S47 has the advantage that some computations may be dispensed with that are involved if sub-step S48 is performed.

Figure 10:
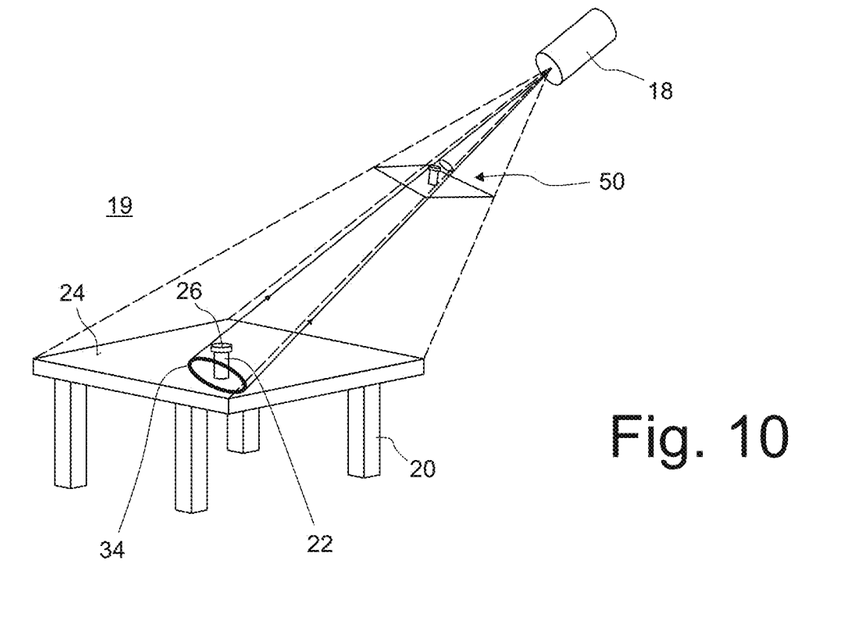
FIG. 10 illustrates a first projection of a second 3D object for producing a 2D image thereof.

In a step S6, a first projection of the second virtual 3D object 34' is calculated, thereby using the 3D coordinates calculated in step S5. This projection produces a 2D image 50 of the second virtual 3D object from the pose of the camera 18, as this is illustrated in FIG. 10.

In a step S7, the first image is augmented by overlaying the first projection of the second 3D object that was calculated in step S6. This is what the users see on the display 16 of the smartphone 10 and simultaneously on the display 32 of the tablet computer 30 after the off-site expert has input the circle 32. If processing power is an issue, it is also possible to first overlay the first virtual 3D object with the first image until the calculation of the second 3D object has been completed.

In a step S8, the camera moves from the first position to a second position and acquires, from the second position, a second image of the three-dimensional scene 19.

Figure 11:
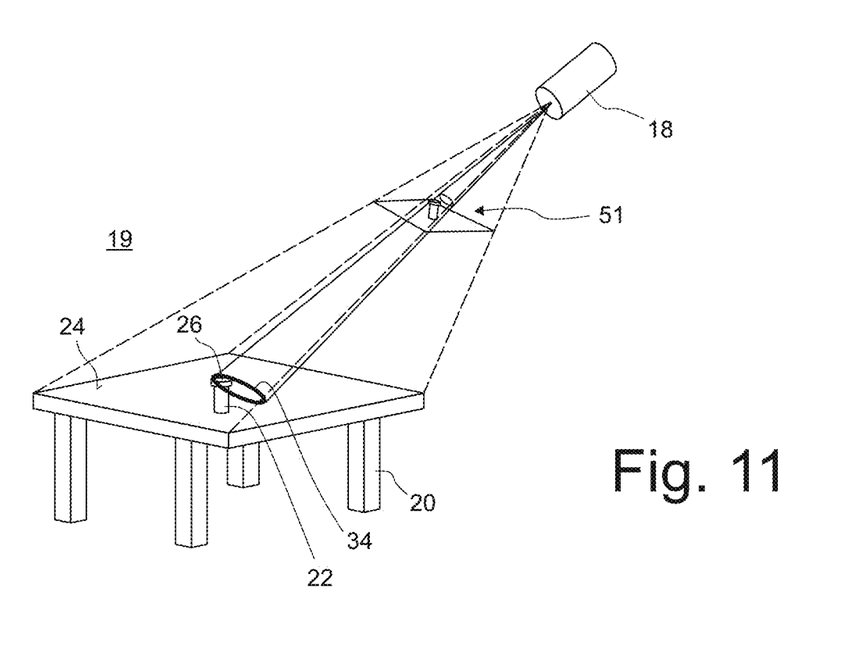
FIG. 11 illustrates a second projection of the second 3D object for producing another 2D image thereof from a different camera pose.

In a step S9, a second projection of the second 3D object is calculated for the second position, thereby using the 3D coordinates calculated in step S5. This projection produces a different 2D image 51 of the second virtual 3D object for the changed camera pose, as this is illustrated in FIG. 11.

Finally, in a step S10, the second image is augmented by overlaying the second projection of the second 3D object calculated in step S9. In the images shown on the displays 18, 30, the virtual 3D circle 34' is now correctly placed so that the lid 26 is unambiguously marked although the pose of the camera 18 has meanwhile changed.

3. Pattern Recognition

A second approach to achieve a correct placement of the virtual 3D circle 34'- or more generally a virtual 3D object derived from a user input—in the scene 19 involves the use of a 2D pattern recognition algorithm. This approach is conceptually simpler than the first approach outlined above and yields better results if the 2D object drawn by a user is not a closed line. However, the second approach requires additional algorithms that are currently not available in AR programming platforms such as ARCore.

The method in accordance with the second approach includes the same steps S1 to S10 that have been explained above for the first approach. The only difference occurs in step S4 in which the 3D coordinates of a point of interest are calculated. According to the second approach, the determination of a pixel, from which the point of interest is derived, does not involve the calculation of 3D centroid, but using a pattern recognition algorithm.

If we assume again that the off-site expert marks the lid 26 by encircling it with a circle 34, the pattern recognition algorithm a) first recognizes that the object shall represent a closed line, and b) computes a 2D centroid for this closed line in order to determine its geometric center. This 2D centroid represents a pixel from which the point of interest is derived by calculating its 3D coordinates that are associated with this pixel, thereby using the allocations of pixels to 3D coordinates that have been calculated in step S2. The method then proceeds with step S5 in which 3D coordinates of a second 3D object (circle) are calculated, thereby assuming that the second 3D object is located at the same distance from the camera 18 as the point of interest.

Also, with the second approach it is possible to consider not only a single pixel, but a plurality of pixels in a defined neighborhood of the 2D centroid. For each of these pixels the 3D coordinates may be calculated, and the point of interest will again be derived from the pixel for which the shortest distance to the camera 18 is calculated.

The second approach works particularly well in situations in which a user does not mark elements in an image by drawing circles, but other symbols, for example arrows or crosses.

Figure 12:
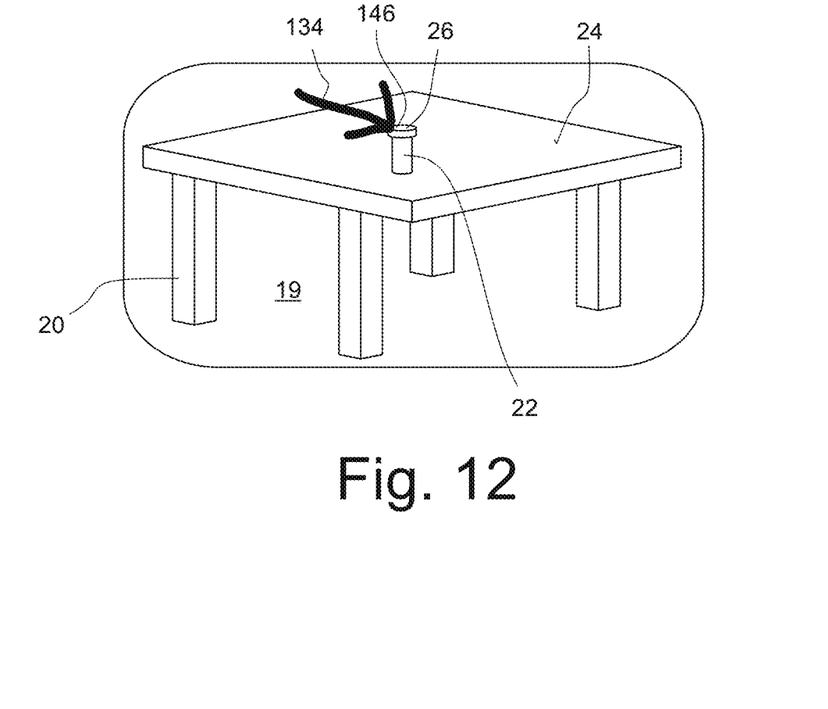
FIG. 12 is an image of the scene similar to FIG. 5, but assuming that the off-site expert draws an arrow with a tip pointing at an element of the scene to be marked.

FIG. 12 is an image of the scene 19 similar to FIG. 5. Here it is assumed that for marking the lid 26, the off-site expert draws an arrow 134 with a tip pointing at the lid 26 that shall be marked. Again, the off-site expert may do this by performing a pan gesture with his one of his fingers on the touch sensitive display 32, or he may use another user interface such as a mouse or a touchpad for drawing the arrow 134.

The pattern recognition algorithm analyses the 2D object and determines a) that it represents an arrow 134, and b) the pixel 146 to which the tip of the arrow 134 points. The next steps are the same as explained above. More specifically, the point of interest is derived by calculating the 3D coordinates that are associated with the pixel 146, thereby using the allocations of pixels to 3D coordinates that have been calculated in step S2. The method then proceeds with step S5 in which the 3D coordinates of the arrow 134 are calculated, thereby assuming that the 3D arrow 134 is located at the same distance from the camera 18 as the point of interest.

Figure 13:
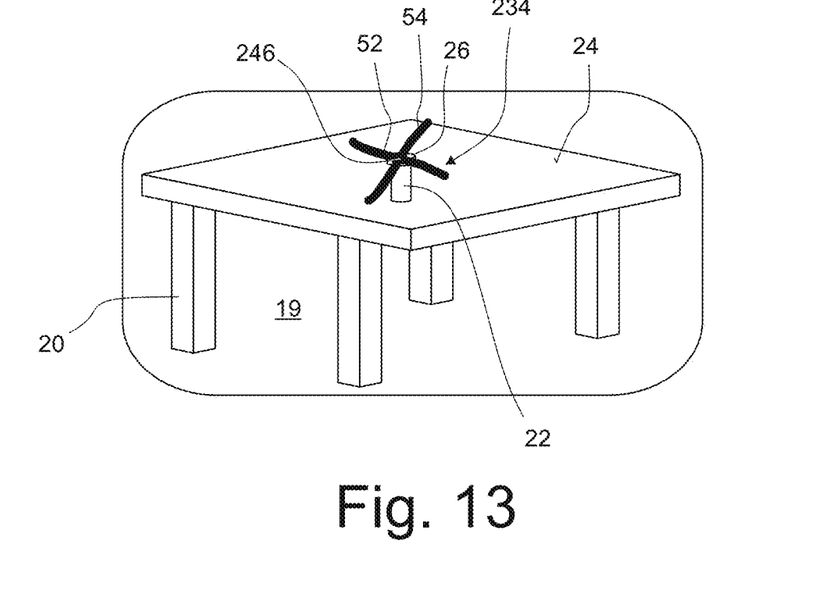
FIG. 13 is an image of the scene similar to FIG. 5, but assuming that the off-site expert draws a cross marking an element of the scene.

FIG. 13 is another image of the scene 19 similar to FIG. 12. Here it is assumed that for marking the lid 26, the off-site expert draws two substantially straight lines 52, 54 that cross at the position of the lid 26. The pattern recognition algorithm analyses this the 2D object 234 and determines a) that it represents two crossing lines 52, 54, and b) the pixel 246 at which the two lines 52, 54 cross. The point of interest is then derived by calculating the 3D coordinates that are associated with the pixel 246, thereby using the allocations of pixels to 3D coordinates that have been calculated in step S2. The method then proceeds again with step S5.

Similar to the case of a circle, it is contemplated to consider not only a single pixel, but a plurality of pixels in a defined neighborhood.

Embodiments of the present disclosure have been disclosed and described herein and shown in the drawings as examples to illustrate the technical concepts of the disclosure. This disclosure is not intended to be limited only to or by the embodiments disclosed. The embodiments and this disclosure may be modified with the spirit and scope of the appended claims.

What is claimed is:

1. A method implemented by a computer for generating an augmented image, the method comprising:
   a) acquiring, from a first position, a first image of a three-dimensional (3D) scene using a camera;
   b) obtaining 3D information of the 3D scene and calculating allocations of 3D coordinates to pixels in the first image;
   c) detecting a user input representing a shape and a position of a spatially extended two-dimensional (2D) object in the first image;
   d) calculating 3D coordinates of a point of interest that is associated with the 2D object, wherein this calculating step comprises
      calculating a 3D centroid of a first 3D object that is derived from the 2D object;
   e) calculating 3D coordinates of a second 3D object, thereby assuming that the second 3D object is located at the same distance from the camera as the point of interest;
   f) calculating a first projection of the second 3D object, thereby using the 3D coordinates calculated in step e);
   g) augmenting the first image by overlaying the first projection of the second 3D object calculated in step f);
   h) moving the camera from the first position to a second position and acquiring, from the second position, a second image of the 3D scene;
   i) calculating a second projection of the second 3D object for the second position, thereby using the 3D coordinates calculated in step e); and
   j) augmenting the second image by overlaying the second projection of the second 3D object calculated in step i),
   wherein in step d) the point of interest is calculated by
      deriving the first 3D object from the 2D object by using the allocations of 3D coordinates to pixels in the image computed in step b),
      calculating the 3D centroid for the first 3D object, and deriving the point of interest from the 3D centroid, and
wherein the step of deriving the point of interest from the 3D centroid includes
projecting the 3D centroid on the first image,
calculating 2D coordinates of the 3D centroid in the first image,
considering pixels in a defined neighborhood of the 2D coordinates of the 3D centroid,
calculating distance values for the considered pixels, and
deriving the point of interest from the pixel for which the shortest distance to the camera is calculated.

2. The method of claim 1, wherein the point of interest is, in a projection on the first image, outside the 2D object or on a borderline of the 2D object.

3. The method of claim 1, wherein in step d) the point of interest is calculated using a 2D pattern recognition algorithm.

4. The method of claim 3, wherein the 2D object is a line that is at least substantially closed, and wherein the point of interest is derived from a 2D centroid of the line.

5. The method of claim 3, wherein the 2D object is an arrow, and wherein the point of interest is derived from a tip of the arrow.

6. The method of claim 3, wherein the 2D object is a figure comprising two crossing lines, and wherein the point of interest is derived from a point at which the two lines cross.

7. The method of claim 1, wherein step b) comprises the steps of acquiring several images from different positions, and comparing the several images in order to obtain 3D information of the scene.

8. The method of claim 1, wherein a change of the second position relative to the first position is computed using a tracking algorithm.

9. A mobile terminal configured to perform the method of claim 1, wherein the mobile terminal comprises a camera configured to acquire the first and the second image, a display configured to display the first and the second image, and data processing means configured to perform the calculations.

10. A non-transitory computer-readable medium encoded with a computer program comprising code instructions for executing the method of claim 1 when the computer program is running on a computer system.

* * * * *